United States Patent
Hsu et al.

(10) Patent No.: US 10,056,768 B2
(45) Date of Patent: Aug. 21, 2018

(54) CHARGING CABINET AND CONTROL METHOD THEREOF

(71) Applicant: AVer Information Inc., New Taipei (TW)

(72) Inventors: Chi-Fa Hsu, New Taipei (TW); Chao-Hung Chang, New Taipei (TW); Lien-Kai Chou, New Taipei (TW)

(73) Assignee: AVER INFORMATION INC., New Taipei (TW)

( * ) Notice: Subject to any disclaimer, the term of this patent is extended or adjusted under 35 U.S.C. 154(b) by 348 days.

(21) Appl. No.: 15/011,803

(22) Filed: Feb. 1, 2016

(65) Prior Publication Data

US 2017/0133868 A1 May 11, 2017

(30) Foreign Application Priority Data

Nov. 6, 2015 (TW) .............................. 104136682 A

(51) Int. Cl.
*H02J 7/00* (2006.01)

(52) U.S. Cl.
CPC ............ *H02J 7/0027* (2013.01); *H02J 7/007* (2013.01); *H02J 7/0021* (2013.01); *H02J 7/0044* (2013.01)

(58) Field of Classification Search
CPC .................................................... H02J 7/0027
USPC ......... 320/107, 115, 152, 157–159, 162–164
See application file for complete search history.

(56) References Cited

U.S. PATENT DOCUMENTS

| | | | | |
|---|---|---|---|---|
| 9,509,155 B2* | 11/2016 | Han | ...................... | H02J 7/0044 |
| 9,667,096 B2* | 5/2017 | Han | ...................... | H02J 9/061 |
| 2010/0176762 A1* | 7/2010 | Daymude | ............. | H02J 7/0027 |
| | | | | 320/115 |
| 2015/0042281 A1* | 2/2015 | Marze | ................... | G06F 1/1632 |
| | | | | 320/115 |

FOREIGN PATENT DOCUMENTS

| | | |
|---|---|---|
| CN | 200983391 Y | 11/2007 |
| CN | 204028181 U | 12/2014 |
| CN | 204651975 U | 9/2015 |
| TW | 344159 B | 11/1998 |
| TW | M393453 U | 12/2010 |
| TW | 201121118 A | 6/2011 |

* cited by examiner

*Primary Examiner* — Richard V Muralidar
(74) *Attorney, Agent, or Firm* — Locke Lord LLP; Tim Tingkang Xia, Esq.

(57) ABSTRACT

A charging cabinet and a control method thereof are disclosed. The charging cabinet includes a controller, a power supply, switches, a charging detector, a status detector, and sockets electrically connected to devices. The switches are selectively tuned on to connect a current path between one of the sockets and the power supply. When a current value of the current path is smaller than a preset current value, the charging detector products a first detection signal. The status detector produces a second detection signal after counting up to more than a preset time period, during which the charging cabinet stays at a suspension status. The controller turns on at least part of the switches after counting up to more than an idle time period, during which the switches in the charging cabinet at the suspension status are tuned off according to the first and second detection signals.

12 Claims, 10 Drawing Sheets

180
CHARGING CABINET AND CONTROL METHOD THEREOF

CROSS-REFERENCE TO RELATED APPLICATIONS

This non-provisional application claims priority under 35 U.S.C. § 119(a) on Patent Application No(s). 104136682 filed in Taiwan, R.O.C. on Nov. 6, 2015, the entire contents of which are hereby incorporated by reference.

BACKGROUND

Technical Field

The disclosure relates to a charging cabinet and a control method thereof, more particularly to a charging cabinet capable of switching between an energy-saving work mode and a normal work mode, and a control method thereof.

Related Art

A charging schedule for a charging cabinet may be embodied by hardware or software. One instance of the charging schedule is a polling charging schedule, in which some devices in the charging cabinet are repeatedly determined whether or not to be charged in turn during a single charging time. Another charging schedule, which is an intelligent charging schedule, set by a specific algorithm according to the current required by each device in each area, is first detected. According to such an intelligent charging schedule, one or more devices in each area are charged in order during a single charging time.

However, both the two schedules waste electricity. Even if a device in the charging cabinet is charged completely, the charging cabinet still continues to repeatedly determine whether or not to charge all the devices in the charging cabinet in turn. This causes a waste of electricity. Moreover, if a device was charged completely and has been disposed in the charging cabinet for a period of time, the quantity of electricity stored in this device might reduce because of other operation actions, or the battery in this device might be damaged because the battery has not been charged or discharged for a long time.

SUMMARY

The disclosure relates to a charging cabinet and a control method thereof, so as to avoid wasting electricity from occurring in the art.

According to one or more embodiments, the disclosure provides a charging cabinet that includes a plurality of sockets, a power supply, a plurality of switches, a charging detector, a status detector and a controller. The sockets are electrically connected to one or more devices. The power supply is electrically connected to the sockets. The switches are electrically connected to the sockets and the power supply and selectively enable a current path between each of the sockets and the power supply. The charging detector is electrically connected to the current path between each of the sockets and the power supply and detects a current value on each of the current paths. When the current value on the current path is smaller than a preset current value, the charging detector generates a first detection signal. The status detector counts a first time period that the charging cabinet stays at a suspension status. When the first time period is longer than a preset time period, the status detector generates a second detection signal. The controller is electrically connected to the charging detector, the status detector and the switches, turns off each of the switches according to the first detection signal and the second detection signal, and counts a second time period that the switches turn off and the charging cabinet also stays at the suspension status. When the second time period is longer than an idle time period, the controller selectively turns on the switches at least in part.

According to one or more embodiments, the disclosure provides a control method applied to a charging cabinet that includes a power supply and sockets. The power supply is electrically connected to the sockets, and the sockets are electrically connected to devices. The control method includes the following steps. Selectively enable a current path between each of the sockets and a power supply. Detect a current value of the current path for each socket. When the current value on the current path is smaller than a preset current value, a first detection signal is generated. Count a first time period that the charging cabinet stays at a suspension status. When the first time period is longer than a preset time period, a second detection signal is generated. According to the first detection signal and the second detection signal, disable the current path between each socket and the power supply. Count a second time period that the current path for each socket is disabled and the charging cabinet also stays at the suspension status. When the second time period is longer than an idle time period, the current path between each of at least part of the sockets and the power supply is selectively enabled.

According to the above charging cabinet and the above control method thereof, the charging detector is used to determine whether a current value on a current path is smaller than a preset current value, and the status detector is used to determine whether a first time period that the charging cabinet stays at the suspension status, is longer than a preset time period, whereby the charging cabinet is switched to perform the energy-saving work mode. Also, the charging cabinet and the control method thereof determine the occurrence of the power consumption of the device by determining whether a second time period that the charging cabinet stays at the suspension status in the energy-saving work mode, is longer than an idle time period, in order to recharge the device that has consumed power.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
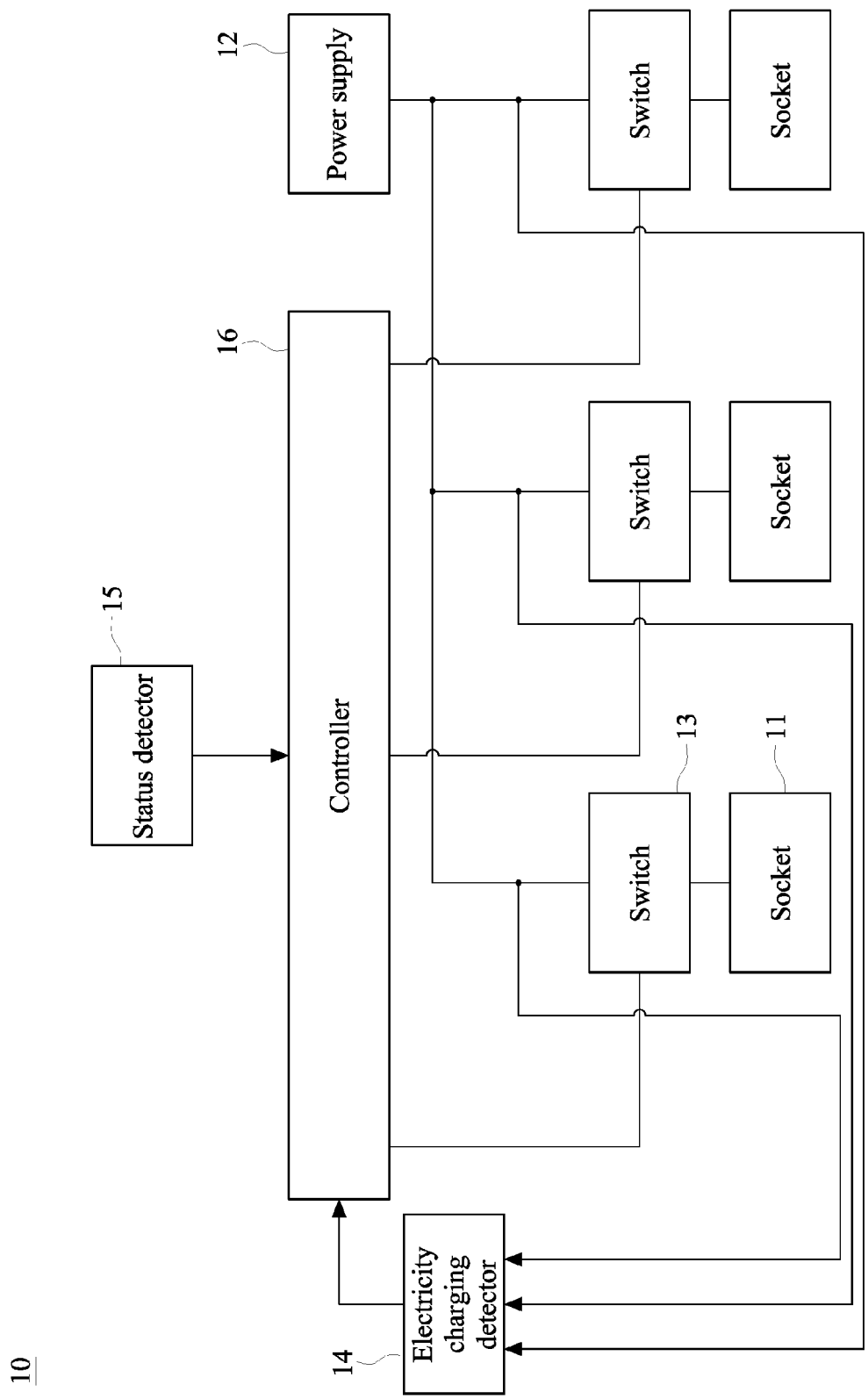
FIG. 1 is a block diagram of a charging cabinet in an embodiment.

Please refer to FIG. 1. FIG. 1 is a block diagram of a charging cabinet in an embodiment. As shown in FIG. 1, a charging cabinet 10 includes a plurality of sockets 11, a power supply 12, switches 13, a charging detector 14, a status detector 15 and a controller 16. Each of the sockets 11 is electrically connected to devices to charge the devices. For example, the device is, but not limited to, a mobile phone, a notebook computer, a tablet computer and another suitable electronic device. The power supply 12 is electrically connected to the sockets 11 and supplies power to the devices that connects to the sockets 11. The switch 13 is electrically connected to the related socket 11 and the power supply 12 and selectively enables a related current path between the related socket 11 and the power supply 12. The charging detector 14 is electrically connected to the current paths between the sockets 11 and the power supply 12 and detects the current value on each current path. When the current value on the current path is smaller than a preset current value, the charging detector 14 generates a first detection signal. The status detector 15 counts a first time period that the charging cabinet 10 stays at a suspension status. When the first time period is longer than a preset time period, the status detector 15 generates a second detection signal. The controller 16 is electrically connected to the charging detector 14, the status detector 15 and the switches 13. The controller 16 turns off the switch 13 according to the first and second detection signals and counts a second time period that the switch 13 is turned off and the charging cabinet 10 also stays at the suspension status. When the second time period is longer than an idle time period, the controller 16 selectively turns on at least part of the switches 13.

Figure 2:
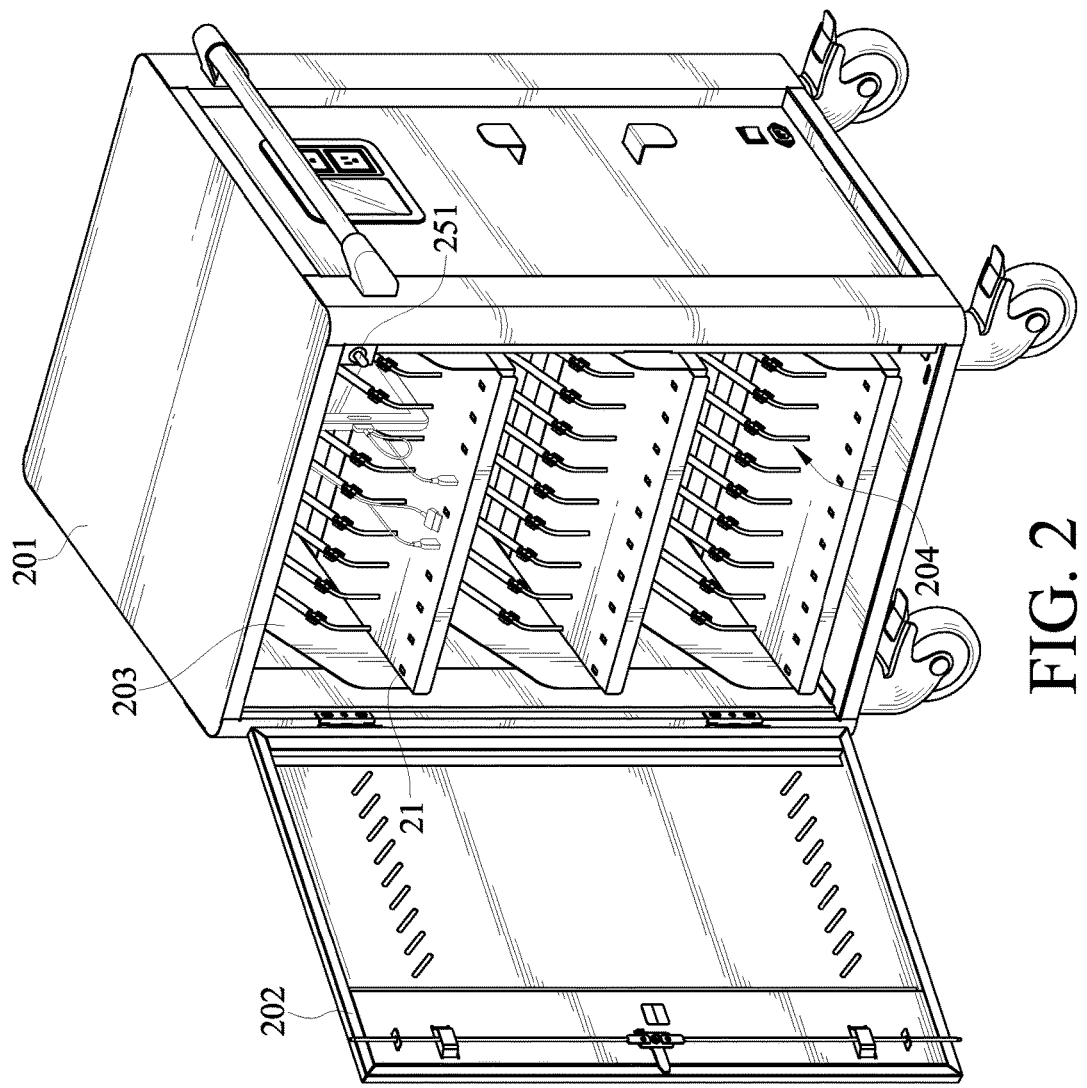
FIG. 2 is a schematic diagram of a charging cabinet in another embodiment.
Figure 3:
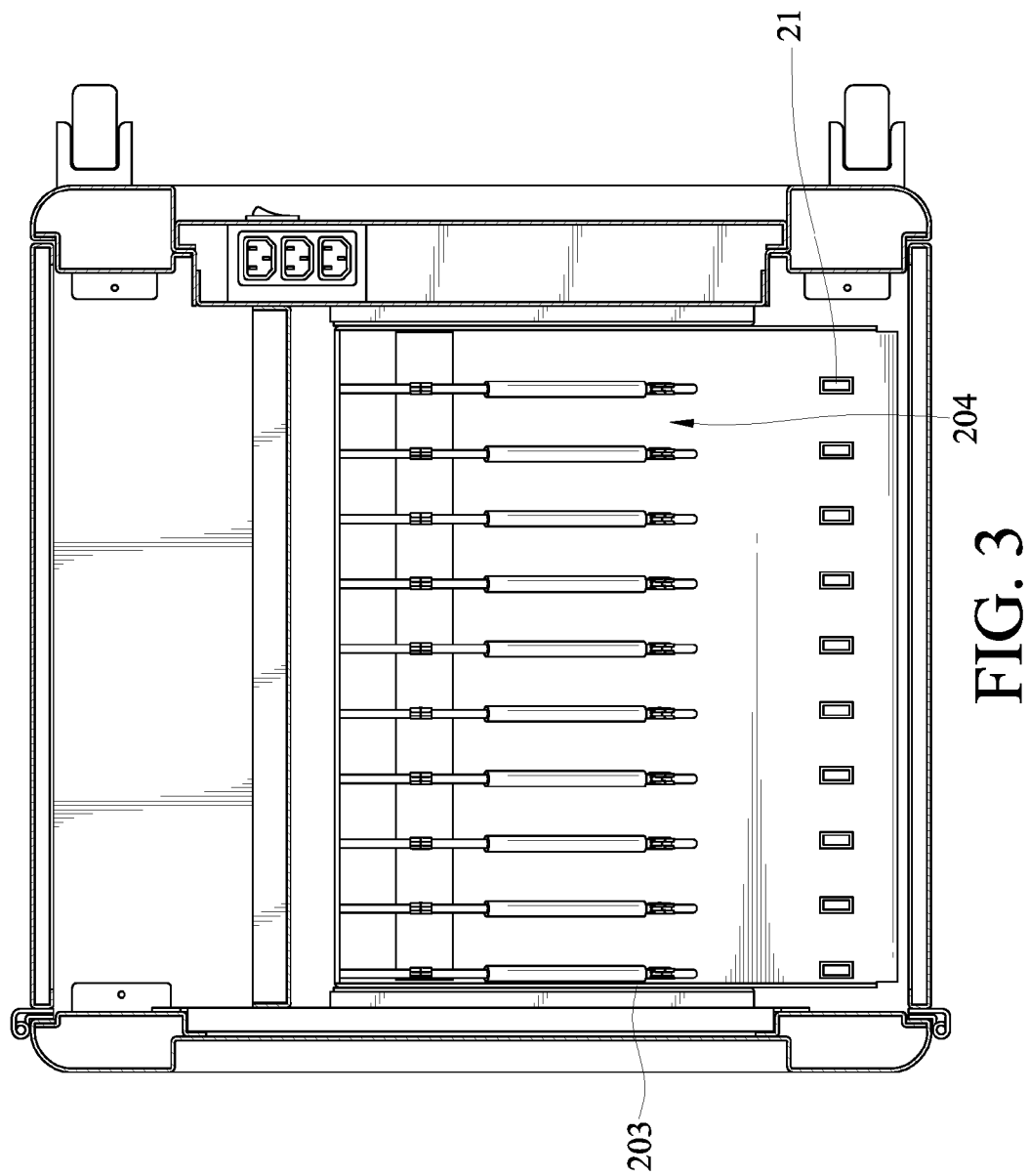
FIG. 3 is a schematic diagram of sockets in another embodiment.
Figure 4:
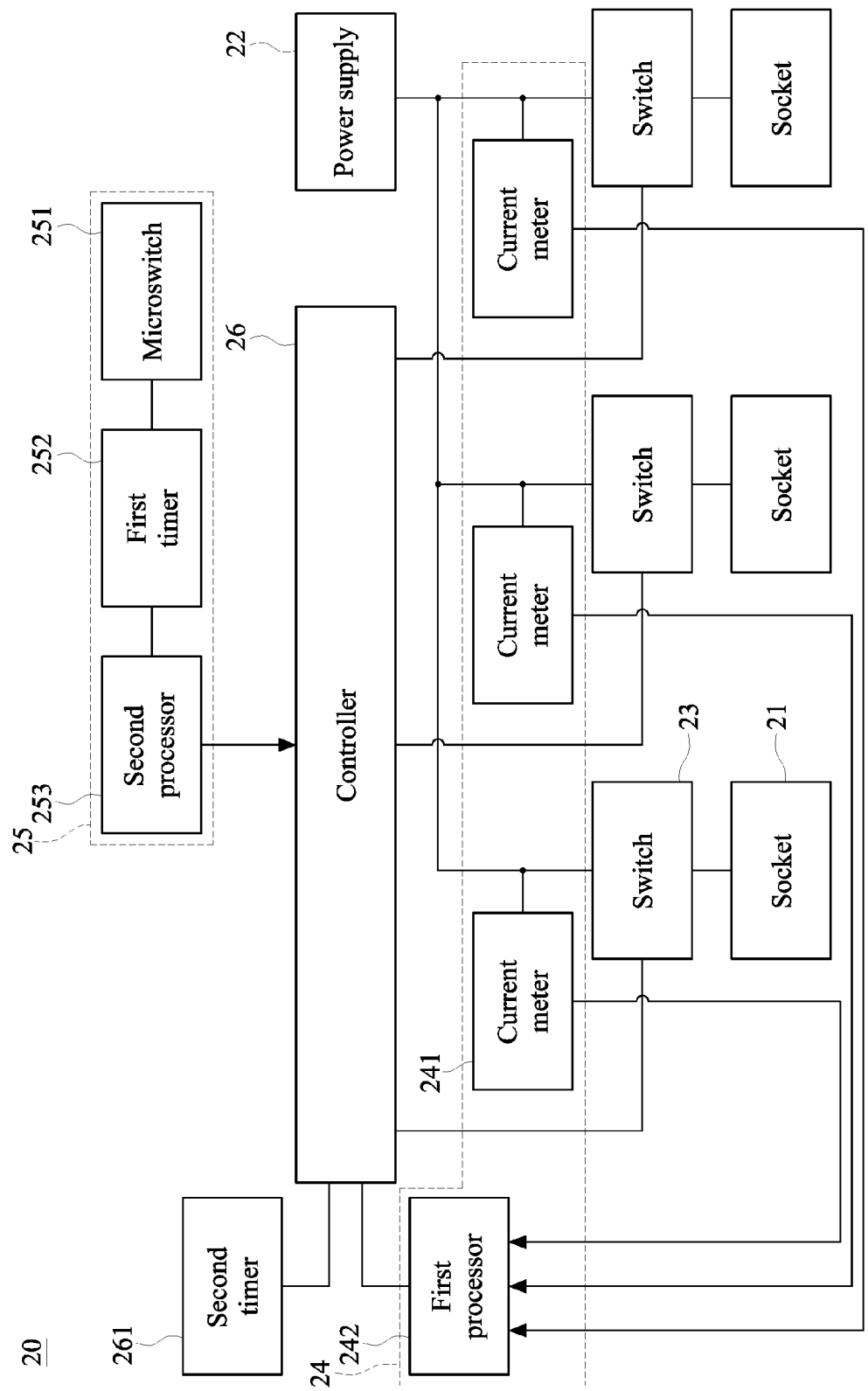
FIG. 4 is a block diagram of a charging cabinet in another embodiment.

To clarify the charging cabinet, Please refer to FIG. 2 to FIG. 4. FIG. 2 is a schematic diagram of a charging cabinet in another embodiment, FIG. 3 is a schematic diagram of sockets in another embodiment, and FIG. 4 is a block diagram of a charging cabinet in another embodiment. A charging cabinet 20 includes a container 201, a door plank 202, sockets 21, a power supply 22, switches 23, a charging detector 24, a status detector 25 and a controller 26. The door plank 202 is disposed at the opening of the container 201. The sockets 21 are disposed in the container 201 and electrically connected to the power supply 22. In an embodiment, the container 201 includes partition shelves 203. The partition shelves 203 divide the inner space of the container 201 into multiple disposition areas 204. In each of the disposition areas 204, at least one socket 21 is disposed. Instances of the devices include one or more mobile phones, one or more notebook computers, one or more tablet computers and other suitable electronic devices, and the devices are disposed in the disposition areas 204 and electrically connected to the sockets 21 to receive the power supplied by the power supply 22.

The switch 23 is electrically connected to one socket 21 and the power supply 22 and selectively enables the current path between the socket 21 and the power supply 22. Specifically, under the normal work mode, the controller 26, according to a charging schedule, controls the turned-on of the switches 23, and the power supply 22 also powers the devices in the container 201 in turn according to the charging schedule to charge the devices. The charging schedule for the charging cabinet 20 is set according to a chronological order that the devices are electrically connected to the sockets 21 in an embodiment, or according to the voltage values by which the devices should be charged in another embodiment. A person skilled in the art should know that the charging schedule may be designed according to actual requirements, and the disclosure will not be restricted to the above embodiments.

The charging detector 24 includes current meters 241 and a first processor 242. The current meters 241 are electrically connected to the current paths between the sockets 21 and the power supply 22 and detect the current value on each of the current paths. The first processor 242 is electrically connected to the current meter 241 and determines whether the current value read by each of the current meters 241 is smaller than a preset current value. When the current value read by each of the current meters 241 is smaller than the preset current value, the first processor 242 generates a first detection signal.

The status detector 25 includes a micro switch 251, a first timer 252 and a second processor 253. For example, the micro switch 251 is disposed near the opening of the container 201 and faces a flank of the door plank 202. The micro switch 251 detects whether the door plank 202 covers the opening of the container 201. Specifically, when the door plank 202 covers the opening of the container 201, the door plank 202 leans on the micro switch 251, whereby the micro switch 251 generates a triggering signal for the first timer 252. The first timer 252 counts a first time period that the door plank 202 covers the opening of the container 201, according to the triggering signal generated by the micro switch 251. The second processor 253 is electrically connected to the first timer 252 and determines whether the first time period is longer than a preset time period. That is, the status detector 25 determines whether the time period, spent on the suspension status where the door plank 202 in the charging cabinet 20 covers the container 201, exceeds the preset time period.

The controller 26 includes a second timer 261. The controller 26 is electrically connected to the charging detector 24, the status detector 25 and the switches 23. When the controller 26 turns off one or more switches 23 according to the first detection signal and the second detection signal, the charging cabinet 20 will enter into the energy-saving work mode. The second timer 261 starts counting a second time period when the controller 26 turns off the switch 23 and then enters into the energy-saving work mode. When the second time period is longer than an idle time period, the controller 26 selectively turns on the switches 23 in part, and this will described in detail later. However, when the second time period is not longer than the idle time period, it means that the charging cabinet 20 is not idle, so the second timer 261 stops counting the second time period and the controller 26 switches the charging cabinet 20 to the normal work mode to perform the charging schedule.

In an exemplary embodiment, the devices includes a mobile phone, a notebook computer and a tablet computer and are disposed in the disposition areas 204 in the container 201, respectively, and the mobile phone, the notebook computer and the tablet computer are electrically connected to the sockets 21, respectively. In the normal work mode, the controller 26 charges the mobile phone, the notebook computer and the tablet computer in turn according to the charging schedule. The current meter 241 detects the currents flowing between the power supply 22 and the sockets, which are connected to the mobile phone, the notebook computer and the tablet computer respectively. When the power provided to the mobile phone by the power supply 22 is sufficient to completely charge the mobile phone, the current value of a current flowing between the power supply 22 and the mobile phone will be smaller than its preset current value. Similarly, when the current values of the currents flowing to the notebook computer and the tablet computer from the power supply 22 respectively are smaller than the preset current value, this situation means that the notebook computer and the tablet computer will sufficiently be charged completely. When all the devices connected to the sockets 21 are charged completely, the first processor 242 will generate a first detection signal.

On the other hand, after a user disposes a mobile phone, a notebook computer and a tablet computer in the container 201 and then closes the door plank 202 of the container 201, the micro switch 251 and the first timer 252 will commence to count a first time period that the door plank 202 is closed. The second processor 253 determines whether the first time period is longer than a preset time period, to decide whether to generate a second detection signal. When the controller 26 receives the first detection signal from the first processor 242 (i.e. the mobile phone, notebook computer and the tablet computer are charged completely) and the second detection signal from the second processor 253 (i.e. the first time period, for which the door plank 202 of the container 201 has been closed, exceeds the preset time period), the controller 26 will turn off the switches 23 and control the charging cabinet 20 to operate in the energy-saving work mode.

Herein, in the energy-saving work mode, the second timer 261 commences to count the second time period. When the second time period is not longer than the idle time period and the door plank 202 of the container 201 is opened, the second timer 261 will stop counting the second time period. The controller 26 again determines whether any new device is disposed in the charging cabinet 20, and then updates the charging schedule for all the devices to be charged. When the door plank 202 of the container 201 is not opened and the second time period counted by the second timer 261 is longer than the idle time period, the controller 26 turns on one or more switches 23, so one or more devices will be charged. The quantity of electricity in a device to be recharged may reduce because of other operational actions or a long idle time. For example, a wireless transmission, a wireless power supply or other operational actions may cause the decrease of the quantity of electricity in a device in the charging cabinet 20.

In an embodiment, when the second time period counted by the second timer 261 is longer than the idle time period, the controller 26 dynamically edits the charging schedule according to the current that will be applied to the device to be charged. In view of the aforementioned example, if the charging detector 24 first scans the devices in the charging cabinet 20 and learns that the mobile phone, the notebook computer and the tablet computer have consumed some of their electricity and need to be recharged, the charging detector 24 will scan and detect the currents required for charging the mobile phone, the notebook computer and the tablet computer, respectively. Then, the controller 26 will update the charging schedule according to such detected information after recording this information. For example, the current required for charging the mobile phone again is 7 A, the current required for charging the notebook computer again is 5 A, and the current required for charging the tablet computer again is 1 A. The controller 26 may preset that a recharging time period is 1 hour, and then allocate a charging time period to each device to be charged. For example, a charging time period for the mobile phone is 30 minutes, a charging time period for the notebook computer is 20 minutes, and a charging time period for the tablet computer is 10 minutes, and thus, the controller 26 assigns a relatively high priority of power charging to the mobile phone having a relatively large requirement of power charging. In an embodiment, if the charging cabinet 20 presets that a maximum output current value is 8 A, and the charging detector 24 detects that the current required by the mobile phone drops to 3.5 A after the mobile phone has been charged for 15 minutes, the controller 26 may add the tablet computer in the charging schedule according to the previously-recorded current value required by the device to be charged. That is, the power supply 12 may output a 3.5 A current to the mobile phone and outputs a 1 A current to the tablet computer. Later, if a sum of the currents required by the mobile phone and the tablet computer is smaller than 3 A, the notebook computer may be added in the charging schedule and be charged together.

In the previous instance, no new device is disposed in the charging cabinet 20 if the door plank 202 of the container 201 is not opened yet, so the charging cabinet 20 may predeterminedly scan and record the currents required for charging the mobile phone, the notebook computer and the tablet computer in the beginning of the recharging time period, respectively and then dynamically arrange the priority of charging the device to be charged according to the recorded current values. This embodiment is exemplified by the mobile phone, the notebook computer and the tablet computer. In a particular embodiment, the mobile phone, the notebook computer and the tablet computer may correspond to three different areas, e.g. a first charging area, a second charging area and a third charging area, where the sockets 21 are located, in the charging cabinet 20, respectively. That is, the sockets 21 are grouped into three sets of sockets, each of which is located a respective charging area and corresponds to either the mobile phone, the notebook computer or the tablet computer. Therefore, when a charging schedule of recharging starts, the charging detector 24 first scans the currents required by the first, second and third charging areas in the charging cabinet 20 and dynamically edits the schedule of recharging according to the currents required by the first, second and third charging areas.

In this embodiment, the first timer 252 counts a first time period for which the door plank 202 has covered the opening of the container 201, and the second timer 261 electrically connected to the controller 26 counts a second time period. In a particular embodiment, the first timer 252 may be a part of the timing circuit in either the status detector 25 or the second processor 253 and count a time according to a clock signal in the second processor 253, and the second timer 261 may be a part of the timing circuit in the controller 26 and count a time according to a clock signal in the controller 26. Moreover, in this embodiment, one current meter 241 is disposed on the current path between each of the sockets 21 and the power supply 22, and the first processor 242 determines whether the current value read by each of the current meters 241 is smaller than its preset current value, so as to generate a first detection signal. Other embodiments may be contemplated in which one current meter is used to read the current value on the current path between each of the sockets 21 and the power supply 22 in turn and which the first processor 242 is a part of the logic circuit in the controller 26. In other words, in other embodiments, one current meter is used to in turn read the current values on the current paths between the sockets 21 and the power supply 22 and send the readings to the controller 26, so the controller 26 determines the current value on the current path between each of the sockets 21 and the power supply 22 is smaller than a preset current value, to decide whether to generate the first detection signal. However, the disclosure will not be limited by these embodiments.

Figure 5:
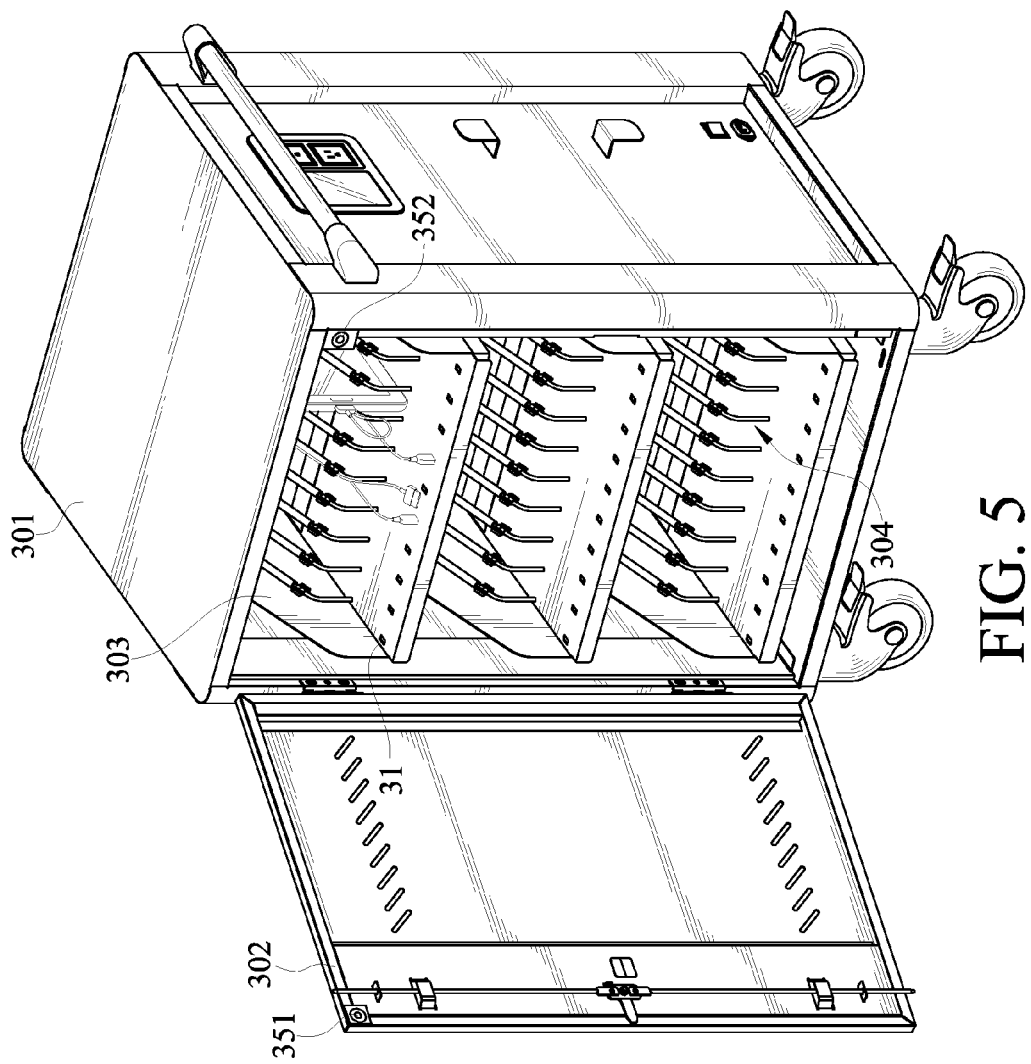
FIG. 5 is a schematic diagram of a charging cabinet in yet another embodiment.
Figure 6:
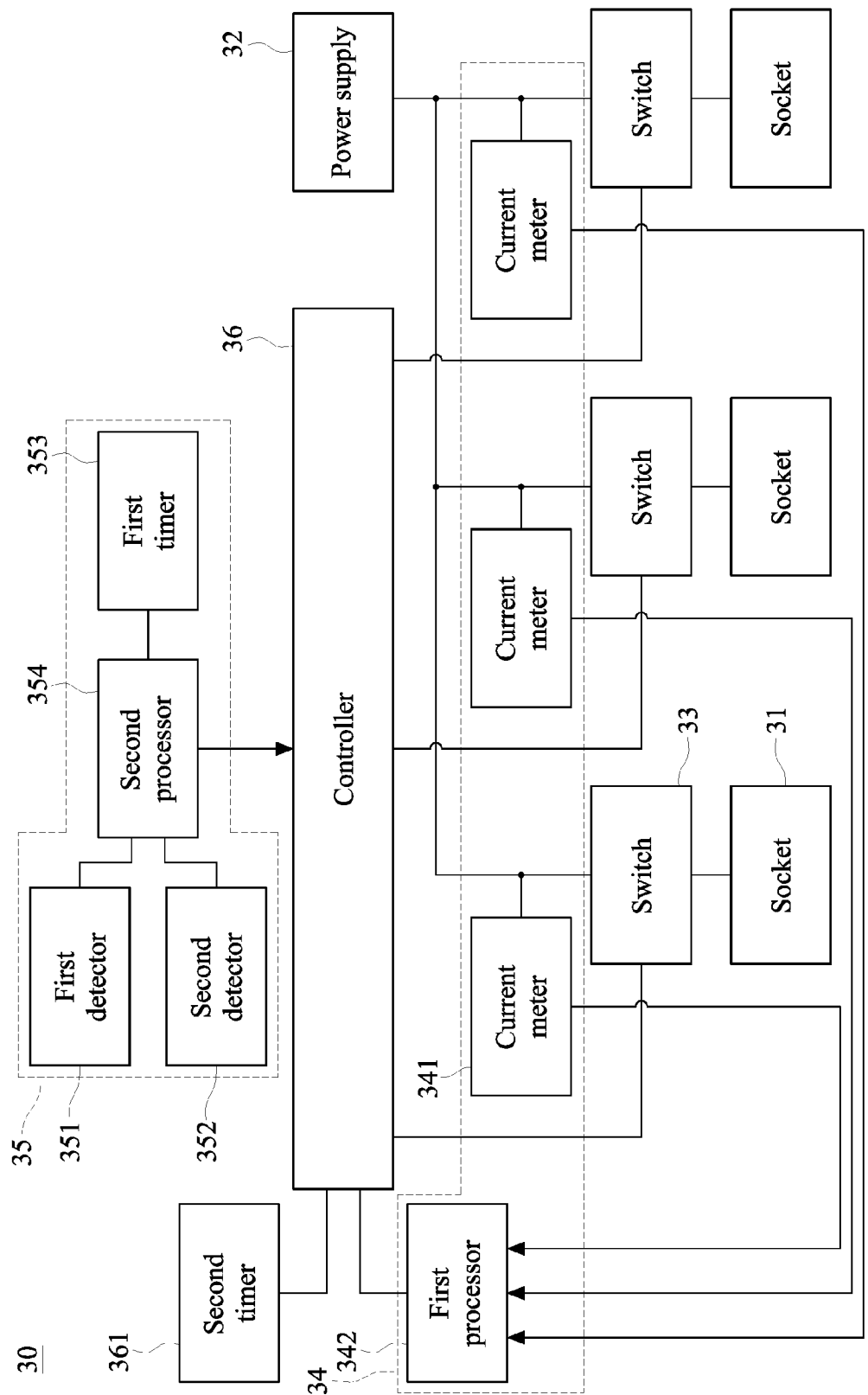
FIG. 6 is a block diagram of a charging cabinet in yet another embodiment.

Next, please refer to FIG. 5 and FIG. 6. FIG. 5 is a schematic diagram of a charging cabinet in yet another embodiment, and FIG. 6 is a block diagram of a charging cabinet in yet another embodiment. As shown in the drawings, a charging cabinet 30 includes a container 301, a door plank 302, sockets 31, a power supply 32, switches 33, a charging detector 34, a status detector 35 and a controller 36. The container 301, the door plank 302, the sockets 31, the power supply 32, the switches 33, the charging detector 34 and the controller 36 are substantially the same as the relevant components in the previous embodiment. As compared to the previous embodiment, the status detector 35 includes a first detector 351, a second detector 352, a first timer 353 and a second processor 354. The first detector 351 is disposed on a door plank, and the second detector 352 is disposed near the opening of the container 301 and faces the first detector 351. The first detector 351 and the second detector 352 are used to sense whether the door plank covers the opening of the container 301.

In details, the first detector 351 is, for example, but not limited to, an infrared ray (IR) transmitter, and the second detector 352 is, for example, but not limited to an IR receiver. When the door plank 302 covers the opening of the container 301, the second detector 352 will receive IR light emitted by the first detector 351. The second processor 354 generates a first triggering signal to the first timer 353 according to the connection relationship between the first detector 351 and the second detector 352. The first timer 353 counts a first time period, for which the door plank 302 covers the opening of the container 301, according to the first triggering signal and outputs the count result to the second processor 354. The second processor 354 determines whether the first time period that the container 201 is at suspension status is longer than a preset time period. When the first time period is longer than the preset time period, the second processor 354 will generate a second detection signal.

Then, as the same as the previous embodiment, the controller 36, according to the first detection signal and the second detection signal, turns off the switches 33, so the charging cabinet 30 enters into the energy-saving work mode. The second timer 361 starts to count a second time period when the controller 36 turns off the switches 33 and then enters into the energy-saving work mode. If the second time period is longer than an idle time period, the controller 36 will select and turn on at least part of the switches 33. If the second time period is not longer than the idle time period, the charging cabinet 30 steps down from the suspension status, so the second timer 361 will stop counting the second time period and the charging cabinet 30 is switched to the normal work mode to perform a charging schedule.

In practice, when a user puts one or more mobile phones, one or more notebook computers and one or more tablet computers in a disposition area 304 in the container 301, the one or more mobile phones, the one or more notebook computers and the one or more tablet computers are electrically connected to the sockets 31, respectively. In the normal work mode, the controller 36, according to the charging schedule, controls the in-order charging of the one or more mobile phones, the one ore more notebook computers and the one or more tablet computers, and the charging detector 34 determines whether the one or more mobile phones, the one or more notebook computers and the one or more tablet computers are completely charged. When all the one or more mobile phones, the one or more notebook computers and the one or more tablet computers are completely charged and the door plank 302 of the container 301 has been closed for a first time period longer than a preset time period, the controller 36 will turn off the switches 33 and the charging cabinet 30 will enter into the energy-saving work mode. The second timer 361 then commences counting a second time period during which the charging cabinet 30 is in the energy-saving work mode and the door plank 302 of the container 301 keeps closed.

If the second time period is not longer than the idle time period and the door plank 302 of the container 301 is opened, the second timer 361 will stop counting the second time period and the controller 36 will again determine whether any new devices to be charged are disposed in the charging cabinet 30, to update the charging schedule according to all the devices to be charged. If the door plank 302 of the container 301 is not opened and the second time period counted by the second timer 361 is longer than the idle time period, the controller 36 will turn on the switches 33 to charge the device to be recharged. The quantity of electricity stored in a device may reduce because of other operational actions or a long idle time. For example, a wireless transmission, a wireless power supply or other operational actions may cause the decrease of the quantity of electricity stored in a device in the charging cabinet 30.

Figure 7:
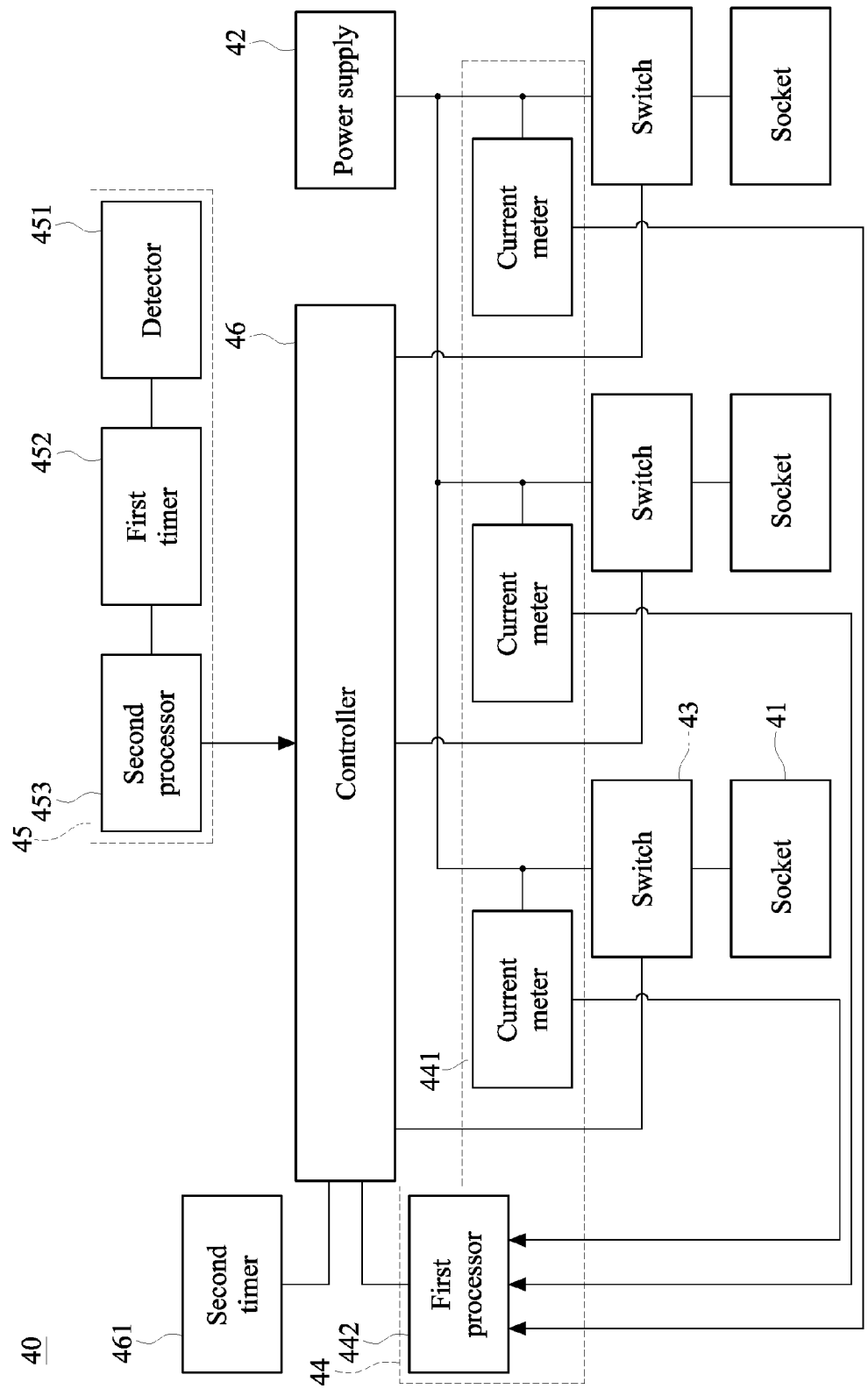
FIG. 7 is a block diagram of a charging cabinet in yet another embodiment.

As described in the above embodiment, whether the door plank of the charging cabinet is opened, is a basis to trigger the controller to again determine whether any new devices are connected to a socket in the charging cabinet. Other embodiments may be contemplated in which, whether to trigger the controller is not based on whether the door plank of the charging cabinet is opened, because the charging cabinet may not have a door plank. Please refer to FIG. 7. FIG. 7 is a block diagram of a charging cabinet in yet another embodiment. As shown in FIG. 7, a charging cabinet 40 includes sockets 41, a power supply 42, switches 43, a charging detector 44, a status detector 45 and a controller 46. The sockets 41, the power supply 42, the switches 43, the charging detector 44 and the controller 46 are substantially equivalent to the relative components in the previous embodiment. As compared to the previous embodiment, the status detector 45 includes at least one detector 451, a first timer 452 and a second processor 453. The detector 451 detects one or more disposition areas for accommodating one or more devices in the charging cabinet 40, as shown in FIG. 3.

The detector 451 is, for example, a weight detector that is disposed at the bottom of the disposition area and is used to sense whether any devices are disposed in the disposition area. The detector 451 is, for example, an IR transmitter-receiver pair, which is disposed at the opening of the charging cabinet 40 or in the disposition area and is used to detect whether a user's hand is approaching the opening of the charging cabinet 40 or whether the status of the disposition area changes. When detecting the status of the disposition area changes, the detector 451 will generate a second triggering signal to the first timer 452. The first timer 452 counts a first time period, during which the status of the disposition area does not change yet, according to the second triggering signal and outputs the counting result to the second processor 453. Then, the second processor 453 determines whether the first time period, during which the status of the disposition area does not change, is longer than its preset time period. When the first time period is longer than the preset time period, the second processor 453 will generate a second detection signal.

In this embodiment, the disposition area is located in the charging cabinet 40. Other embodiments may be contemplated in which the disposition area is located outside the charging cabinet 40. For example, the disposition area corresponds to the sockets outside the charging cabinet 40, and the detector may be disposed near or at the position of the socket outside charging cabinet. The disclosure will not have any limitation in the location of the disposition area and the location of the detector.

Figure 8:
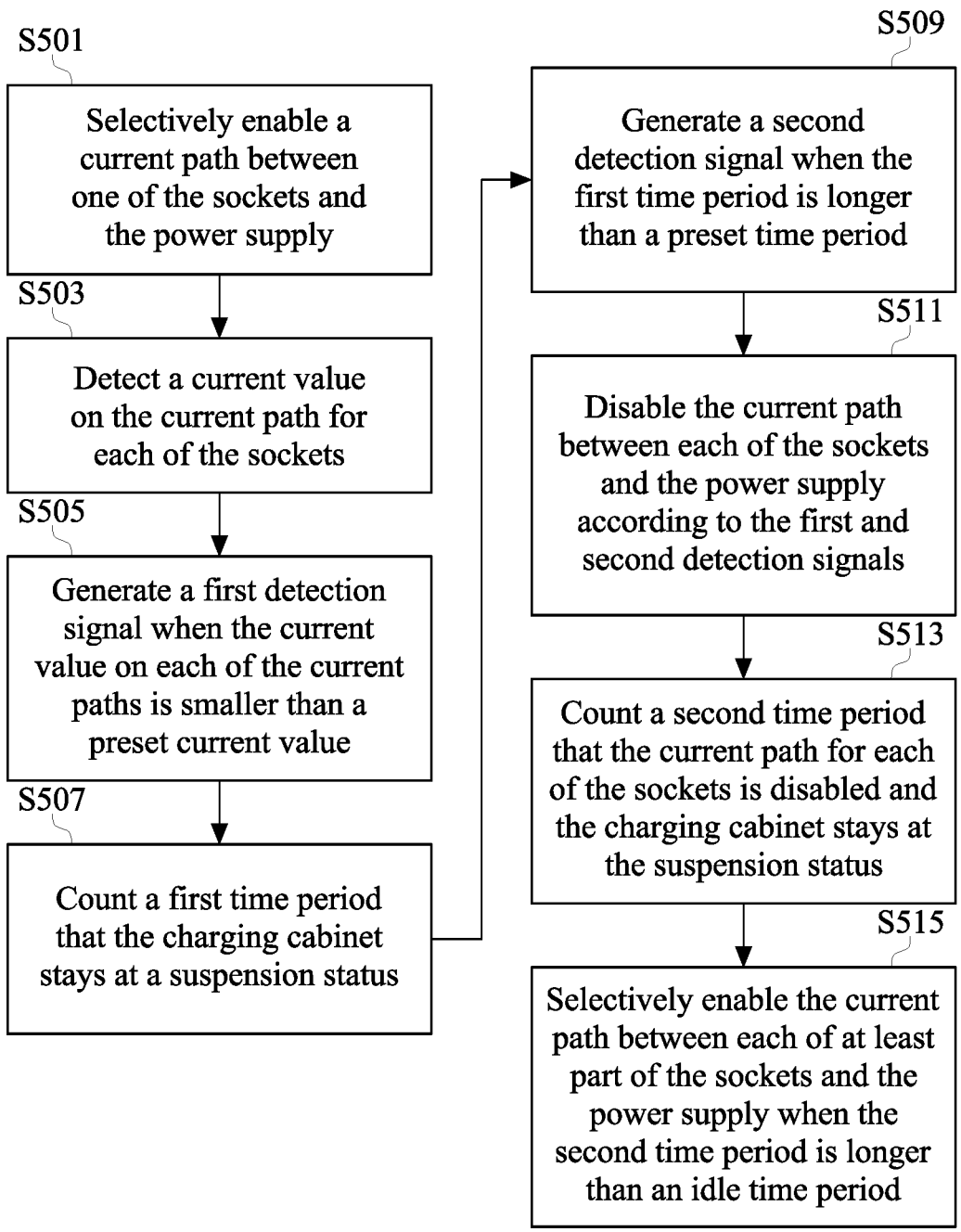
FIG. 8 is a flow chart of a control method of the charging cabinet in an embodiment.

To clarify the control method of the above charging cabinet, please refer to FIG. 1 and FIG. 8. FIG. 8 is a flow chart of a control method of the charging cabinet in an embodiment. As shown in the drawings, the control method includes the following steps. In step S501, selectively enable one or more current paths between the sockets 11 and the power supply 12. In step S503, detect the current value on the current path for each of the sockets 11. In step S505, when the current value on the current path is smaller than a preset current value, a first detection signal is generated. In step S507, count a first time period that the charging cabinet 10 is at a suspension status. In step S509, when the first time period is longer than a preset time period, a second detection signal is generated. In step S511, disable one or more of the current paths between the sockets 11 and the power supply 12 according to the first detection signal and the second detection signal. In step S513, count a second time period that the current path for the socket 11 is disabled in the charging cabinet 10 that is at the suspension status. In step S515, when the second time period is longer than an idle time period, at least part of the current paths is enabled selectively.

Figure 9A:
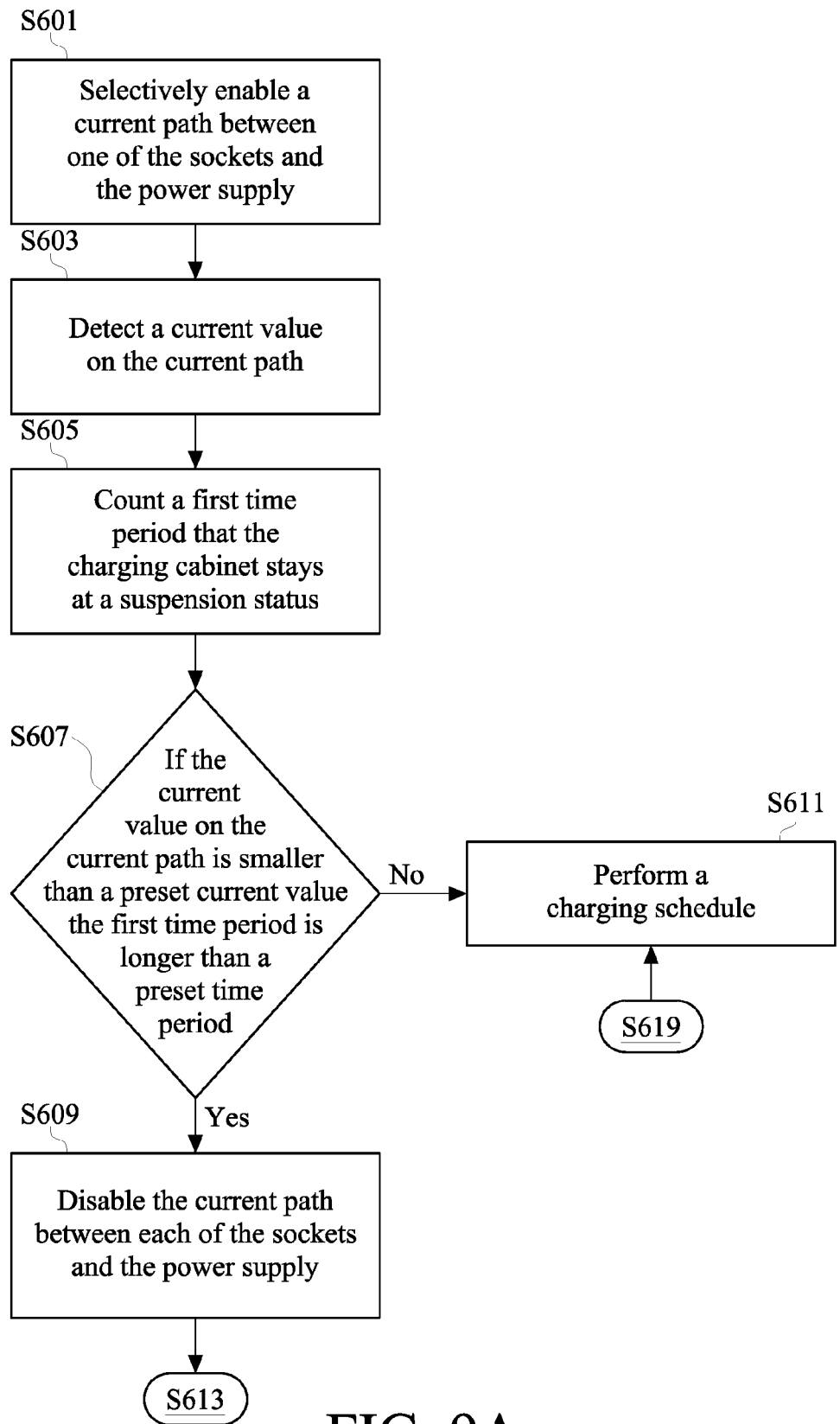
FIG. 9A and FIG. 9B illustrate a flow chart of a control method of the charging cabinet in another embodiment.
Figure 9B:
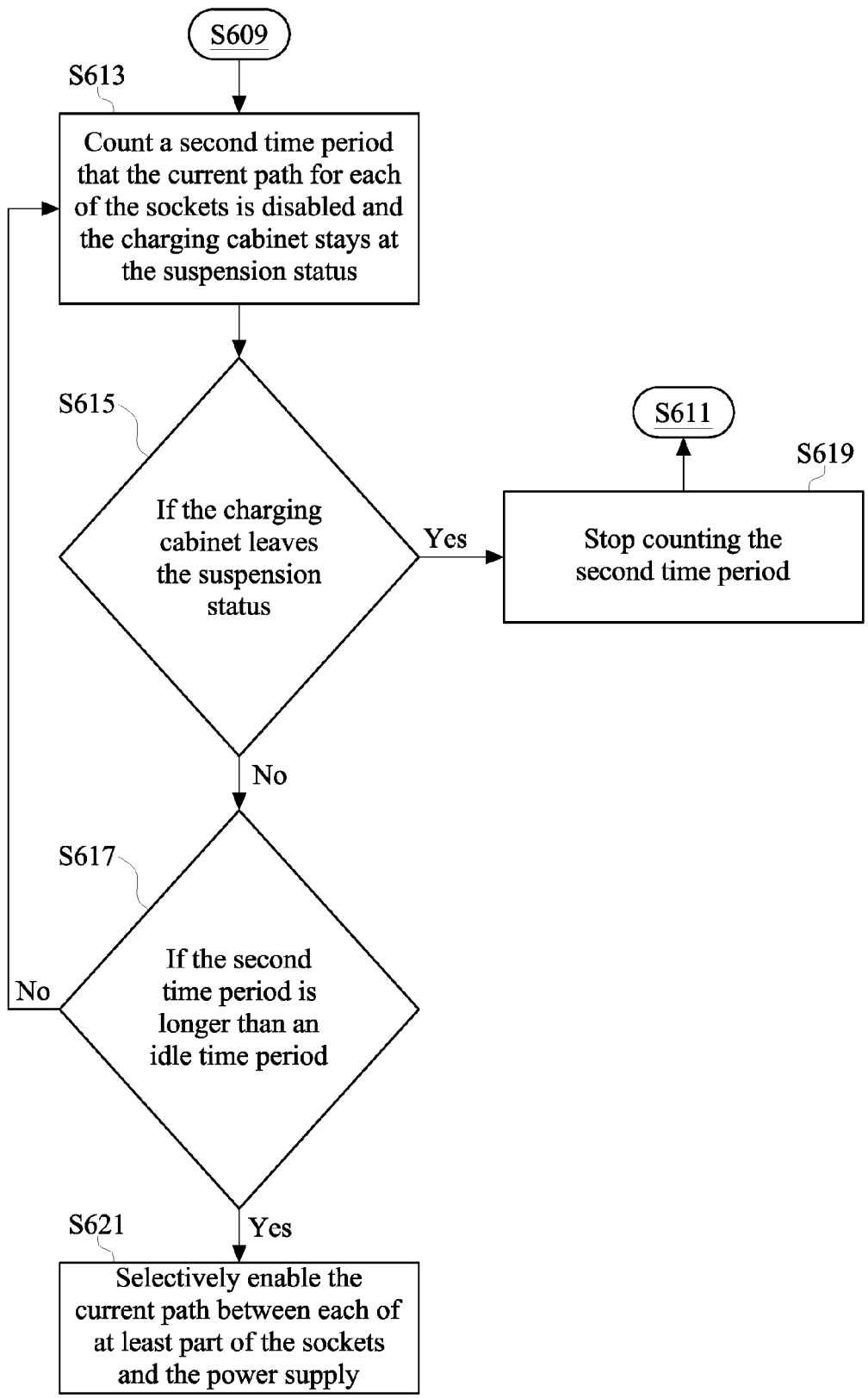

In another embodiment, please refer to FIG. 1, FIG. 9A and FIG. 9B. FIG. 9A and FIG. 9B illustrate a flow chart of a control method of the charging cabinet in another embodiment. As shown in the drawings, in step S601, selectively enable one or more current paths between the sockets 11 and the power supply 12. In step S603, detect the current value on the current path for each of the sockets 11. In step S605, count a first time period that the charging cabinet 10 is at a suspension status. In step S607, determine whether the current value on the current path is smaller than a preset current value, and determine whether the first time period is longer than a preset time period. In step S609, when the current value on the current path is larger than the preset current value and the first time period is longer than the preset time period, the current paths between the sockets 11 and the power supply 12. In step S611, when the current value on the current path is not larger than the preset current value, or when the first time period is not longer than the preset time period, the charging cabinet 10 updates a charging schedule according to one or more devices to be charged, and charges the one or more devices to be charged according to the charging schedule.

Then, in step S613, when the controller 16 disables the one or more current paths between the sockets 11 and the power supply 12, the controller 16 counts a second time period that the one or more current paths for one or more sockets 11 are disabled in the charging cabinet 10 that is at the suspension status. In step S615, the controller 16 determines whether the charging cabinet 10 leaves the suspension status. In step S617, determine whether the second time period that the charging cabinet 10 stays at the suspension status, is longer than the idle time period when the charging cabinet 10 does not leave the suspension status. In step S621, when the second time period is longer than the idle time period, the controller 16 enables at least part of the current paths, i.e. each current path connected to a device, in order to determine whether any device connected to one current path is not full of electricity, and to charge the device that is not full of electricity. In step S619, when the charging cabinet 10 leaves the suspension status, the controller 16 stops counting the second time period, and the process returns to step S611 to reschedule all the devices to be charged and charge one or more devices to be charged according to a new charging schedule.

As set forth above, the disclosure provides a charging cabinet and a control method thereof, in which the charging cabinet employs a charging detector to determine the current value on each current path is smaller than a preset current value, and employs a status detector to determine whether a first time period that the charging cabinet stays at a suspension status, is longer than a preset time period. According to the determination results of the charging detector and the status detector, the charging cabinet is switched to operate in the energy-saving work mode in order to save power. Moreover, the charging cabinet in the energy-saving work mode determines whether a second time period that the charging cabinet stays at the suspension status, is longer than an idle time period, to decide whether to determine the change of the connection between the charging cabinet and each device, and when the charging cabinet has stayed at the suspension status for a long time, the charging cabinet in the energy-saving work mode would determine whether the quantity of electricity stored in the device has reduced at least in part, thereby recharging the device whose quantity of electricity has reduced.

What is claimed is:

1. A charging cabinet, comprising:
   a plurality of sockets, each of the plurality of sockets electrically connected to a device;
   a power supply, electrically connected to the plurality of sockets;
   a plurality of switches, each of the plurality of switches electrically connected to one of the plurality of sockets and the power supply and selectively enabling a current path between one of the plurality of sockets and the power supply;
   a charging detector electrically connected to the current path between each of the plurality of sockets and the power supply and configured to detect a current value on each of the current paths and when the current value on each of the current paths is smaller than a preset current value, generate a first detection signal;
   at least one status detector configured to calculate a first time period that the charging cabinet stays at a suspension status, and generate a second detection signal when the first time period is longer than a preset time period; and
   a controller, electrically connected to the charging detector, the status detector and the plurality of switches and configured to turn off each of the plurality of switches according to the first and second detection signals and calculate a second time period, which each of the plurality of switches is turned off and the charging cabinet stays at the suspension status, and to selectively at least in part turn on the plurality of switches when the second time period is longer than an idle time period.

2. The charging cabinet according to claim 1, wherein the charging detector comprises:
at least one current meter electrically connected to the current path between each of the plurality of sockets and the power supply and configured to detect the current value on each of the current paths; and
a first processor electrically connected to the at least one current meter and configured to determine whether the current value on each of the current paths is smaller than the preset current value, and to generate the first detection signal when the current value on each of the current paths is smaller than the preset current value.

3. The charging cabinet according to claim 1, wherein the plurality of sockets in the charging cabinet is disposed in a container, a door plank is disposed at an opening of the container, and the status detector comprises:
a micro switch configured to detect whether the door plank covers the opening of the container; and
a first timer electrically connected to the micro switch and configured to calculate the first time period that the opening of the container is covered with the door plank; and
a second processor electrically connected to the first timer and configured to determine whether the first time period is longer than the preset time period, and to generate the second detection signal when the first time period is longer than the preset time period.

4. The charging cabinet according to claim 1, wherein the plurality of sockets in the charging cabinet is disposed in a container, a door plank is disposed at an opening of the container, and the status detector comprises:
a first detector disposed on the door plank;
a second detector disposed on the container;
a first timer configured to calculate the first time period that the opening of the container is covered with the door plank, according to a first triggering signal; and
a second processor electrically connected to the first detector, the second detector and the first timer and configured to generate the first triggering signal according to a connection relationship between the second detector and the first detector and to generate the second detection signal when the first time period is longer than the preset time period.

5. The charging cabinet according to claim 1, wherein the plurality of sockets has at least one disposition area, and the status detector comprises:
at least one detector configured to detect a status of the at least one disposition area and to generate a second triggering signal when the status of the at least one disposition area changes;
a first timer electrically connected to the at least one detector and configured to calculate the first time period that the status of the at least one disposition area has not changed, according to the second triggering signal; and
a second processor electrically connected to the first timer and configured to determine whether the first time period is longer than the preset time period, and to the second detection signal when the first time period is longer than the preset time period.

6. The charging cabinet according to claim 1, wherein the controller further comprises a second timer configured to commence counting the second time period when the controller turns off the plurality of switches, and to stop counting the second time period and switch the charging cabinet to perform a charging schedule when the charging cabinet leaves the suspension status.

7. A control method applied to a charging cabinet comprising a plurality of sockets and a power supply that is electrically connected to the plurality of sockets, each of the plurality of sockets electrically connected to devices, and the control method comprising:
selectively enabling a current path between one of the plurality of sockets and the power supply;
detecting a current value on the current path for each of the plurality of sockets;
generating a first detection signal when the current value on each of the current paths is shorter than a preset current value;
counting a first time period that the charging cabinet stays at a suspension status;
generating a second detection signal when the first time period is longer than a preset time period;
disabling the current path between each of the plurality of sockets and the power supply according to the first detection signal and the second detection signal;
counting a second time period that the current path for each of the plurality of sockets is disabled and the charging cabinet stays at the suspension status; and
selectively enabling the current path between each of at least part of the plurality of sockets and the power supply when the second time period is longer than an idle time period.

8. The control method according to claim 7, further comprising:
determining whether the current value on each of the current paths is shorter than the preset current value; and
performing a charging schedule when the current value on one of the current paths is not smaller than the preset current value.

9. The control method according to claim 7, wherein the plurality of sockets in the charging cabinet is disposed in a container, a door plank is disposed at an opening of the container, and to count the first time period that the charging cabinet stays at the suspension status, comprises:
detecting whether the opening of the container is covered with the door plank; and
counting the first time period that the opening of the container is covered with the door plank when the opening of the container is covered with the door plank.

10. The control method according to claim 7, wherein the charging cabinet further comprises a first detector and a second detector, the plurality of sockets is disposed in a container, a door plank is disposed at an opening of the container, the first detector is disposed on the door plank, the second detector is disposed in the container, and to count the first time period that the charging cabinet stays at the suspension status comprises:
generating a first triggering signal according to a connection relationship between the second detector and the first detector; and
counting the first time period that the opening of the container is covered with the door plank according to the first triggering signal.

11. The control method according to claim 7, wherein the socket has at least one disposition area, and to count the first time period that the charging cabinet stays at the suspension status comprises:
detecting a status of the at least one disposition area;

generating a second triggering signal when the status of the at least one disposition area changes; and according to the second triggering signal, counting the first time period that the status of the at least one disposition area has not changed.

12. The control method according to claim 7, wherein counting the second time period comprises:

commencing counting the second time period when the current path for each of the plurality of sockets is disabled; and stopping counting of the second time period and switching the charging cabinet to perform a charging schedule when the suspension status of the charging cabinet changes.

* * * * *